United States Patent
El Baradai et al.

(10) Patent No.: US 11,349,169 B2
(45) Date of Patent: May 31, 2022

(54) MULTILAYER PACKAGING STRUCTURE FOR A THIN FILM BATTERY AND A METHOD FOR MANUFACTURING OF SUCH A STRUCTURE

(71) Applicant: RENATA AG, Itingen (CH)

(72) Inventors: Oussama El Baradai, Basel (CH); Pascal Haering, Muttenz (CH)

(73) Assignee: RENATA AG, Itingen (CH)

( * ) Notice: Subject to any disclaimer, the term of this patent is extended or adjusted under 35 U.S.C. 154(b) by 0 days.

(21) Appl. No.: 16/973,504

(22) PCT Filed: Jun. 13, 2019

(86) PCT No.: PCT/EP2019/065475
§ 371 (c)(1),
(2) Date: Dec. 9, 2020

(87) PCT Pub. No.: WO2020/007584
PCT Pub. Date: Jan. 9, 2020

(65) Prior Publication Data
US 2021/0249718 A1    Aug. 12, 2021

(30) Foreign Application Priority Data
Jul. 3, 2018   (EP) .................................. 18181337

(51) Int. Cl.
*H01M 50/126* (2021.01)
*H01M 50/548* (2021.01)
(Continued)

(52) U.S. Cl.
CPC ....... *H01M 50/126* (2021.01); *H01M 50/105* (2021.01); *H01M 50/119* (2021.01); *H01M 50/178* (2021.01); *H01M 50/548* (2021.01)

(58) Field of Classification Search
CPC ............. H01M 50/126; H01M 50/548; H01M 50/178; H01M 50/105; H01M 50/119
See application file for complete search history.

(56) References Cited

U.S. PATENT DOCUMENTS 9,634,334 B2 *   4/2017   Ro ..................... H01M 50/209
10,559,790 B2    2/2020   Hong et al.
(Continued)

FOREIGN PATENT DOCUMENTS

ER    2 059 960 A1    5/2009
JP    2005276486 A    10/2005
(Continued)

OTHER PUBLICATIONS

JP2017021976A translation (Year: 2017).*
(Continued)

*Primary Examiner* — Jane J Rhee
(74) *Attorney, Agent, or Firm* — Sughrue Mion, PLLC

(57) ABSTRACT

The present invention relates to multilayer packaging structure (10) for a thin film battery (5) wherein a metal layer (14) is sandwiched between a first layer (11) and a second layer (12). A first opening (21) is arranged in the first layer (11) such that a first portion (24) of the metal layer (14) associated with the first opening (21) is exposed and is configured to be able to be in electrical contact with a current collector of the thin film battery (5). A second opening (22) is arranged in the second layer (12) such that a second portion (25) of the metal layer (14) associated with the second opening (22) is exposed and is configured to be able to be electrically connected to an external circuitry. The invention further relates to a method (30) for manufacturing of the multilayer packaging structure (10).

14 Claims, 3 Drawing Sheets

(51) Int. Cl.
*H01M 50/178* (2021.01)
*H01M 50/105* (2021.01)
*H01M 50/119* (2021.01)

(56) References Cited

U.S. PATENT DOCUMENTS

2015/0171406 A1  6/2015  Bazzarella
2017/0133711 A1  5/2017  Gaben

FOREIGN PATENT DOCUMENTS

| JP | 2012-109125 A | 6/2012 |
| JP | 2012-204182 A | 10/2012 |
| JP | 2013243062 A | 12/2013 |
| JP | 201721976 A | 1/2017 |
| JP | 201769163 A | 4/2017 |
| KR | 10-2009-0113106 A | 10/2009 |
| KR | 10-1681758 B1 | 12/2016 |

OTHER PUBLICATIONS

Communication dated May 6, 2021 in Korean Application No. 10-2020-7037066.
International Search Report of PCT/EP2019/065475 dated Jul. 22, 2019 [PCT/ISA/210].
Written Opinion of PCT/EP2019/065475 dated Jul. 22, 2019 [PCT/ISA/237].
Communication dated Aug. 4, 2021, from the China National Intellectual Property Administration in application No. 201980044779.8.
Communication dated Jul. 27, 2021, from the Japanese Patent Office in application No. 2020569774.
Communication dated Sep. 28, 2021 from the Korean Intellectual Property Office in Application No. 10-2020-7037066.
Communication dated Dec. 3, 2021 from the Korean Intellectual Property Office in Application No. 10-2020-7037066.

* cited by examiner

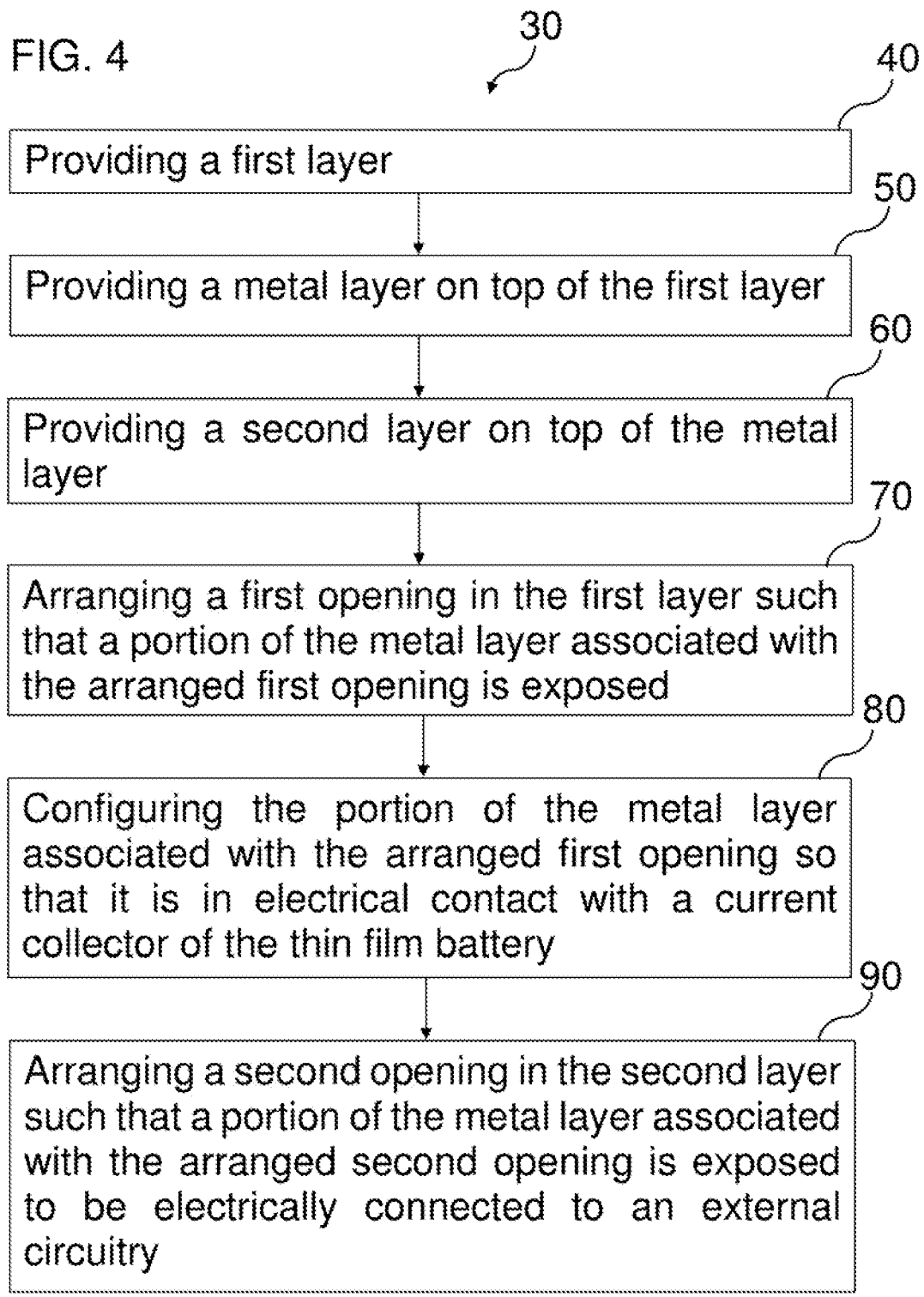

MULTILAYER PACKAGING STRUCTURE FOR A THIN FILM BATTERY AND A METHOD FOR MANUFACTURING OF SUCH A STRUCTURE

CROSS REFERENCE TO RELATED APPLICATIONS

This application is a National Stage of International Application No. PCT/EP2019/065475 filed on Jun. 13, 2019, claiming priority based on European Patent Application No. 18181337.9 filed on Jul. 3, 2018.

FIELD OF THE INVENTION

The present invention relates to a multilayer packaging structure for a thin film battery and a method for manufacturing of such a structure.

BACKGROUND OF THE INVENTION

In the art of battery design, it is well known to enclose the components of the battery cell(s), e.g. anode, cathode and electrolyte, by means of an enclosing element. In the art, this protective external element is frequently referred to as packaging. In this context, packaging realized by stacking multiple, thin material layers is frequently used to obtain lightweight and flexible thin film batteries appreciated by the market.

US 2015/0017518 discloses such a multilayer packaging structure and a thereto related battery. In addition to the plurality of thin, functional layers, the battery has current collector tabs extending beyond the perimeter of the battery, when the packaging is wrapped around the battery cell(s), i.e. when the battery substantially is assembled. The purpose of these current collector tabs is to deliver electric energy from the battery cell(s) to an external load.

As easily inferred, the tabs discussed in US 2015/0017518 perforate the enclosing battery packaging. In connection herewith, particular attention needs to be paid during the battery sealing phase in order to prevent water vapor from permeating into the interior of the battery cell at the points where the current collector tabs pierce through the packaging structure enclosing the battery cell(s).

In the related context and due to various design and production considerations, the current collector tabs of an assembled battery are usually fragile. As a result, they are prone to breaking off and are also easily damaged during manufacturing and/or assembly.

US 2012/0208071 discloses a production method for thin film batteries where terminal holes have been punched in the packaging. In connection herewith, US 2012/0208071 teaches that the current collector tabs may be dispensed with, but the disclosed process is not suitable for battery chemistry based on water vapor sensitive materials.

On the above background, one objective of the invention at hand is to at least alleviate above-identified and other drawbacks associated with the current art.

SUMMARY OF THE INVENTION

The above stated objective is achieved by means of the multilayer packaging structure for a thin film battery and a method for manufacturing of such a structure according to the independent claims, and by the embodiments according to the dependent claims.

More specifically, the first aspect of the present invention is directed at a multilayer packaging structure for a thin film battery, said structure comprising at least a first layer, a second layer, and a metal layer sandwiched between the first layer and the second layer, wherein a first opening is arranged in the first layer such that a first portion of the metal layer associated with the arranged first opening is exposed, said first portion of the metal layer being configured to be able to be in electrical contact with a current collector of the thin film battery and a second opening is arranged in the second layer such that a second portion of the metal layer associated with the arranged second opening is exposed, said second portion of the metal layer being configured to be able to be electrically connected to an external circuitry.

Furthermore, the second aspect of the present invention is directed at a method for manufacturing a multilayer packaging structure for a thin film battery, said method comprising following steps:
providing a first layer,
providing a metal layer on top of the first layer,
providing a second layer on top of the metal layer such that the metal layer is sandwiched between the first layer and the second layer,
arranging a first opening in the first layer such that a first portion of the metal layer associated with the arranged first opening is exposed,
configuring the first portion of the metal layer associated with the arranged first opening so that it is able to be in electrical contact with a current collector of the thin film battery,
arranging a second opening in the second layer such that a second portion of the metal layer associated with the arranged second opening is exposed, said second portion of the metal layer being configured to be able to be electrically connected to an external circuitry.

It is to be noted that the method steps do not have to take place in the above order for the method to be properly executed. In particular, the step of arranging the first/second opening in the first/second layer may take place prior to sandwiching of the metal layer.

In the following, positive effects and advantages of the above-identified main aspects of the invention are presented.

On a general level, by creating openings that allow for the portions of the metal layer of the multilayer packaging structure to become exposed, i.e. accessible by other components, e.g. current collector/external circuitry of an external device, the exposed portions of the metal layer effectively function as a current collector tab.

More specifically and as the metal layer of the packaging structure intrinsically is electrically conductive, exposing a portion of the metal layer that faces the battery cell(s), and bringing said portion of the metal layer in electrical contact with the current collector of the thin film battery entails that the current, generated in the cell(s) and collected by the current collector, may be channelled out of the battery. More particularly and since another exposed portion of the metal layer are able to be electrically connected to an external circuitry by facing the external environment, i.e. by facing away from the battery cell(s), it is possible to, via the metal layer, transfer the collected current and deliver it to an adequately adapted external circuitry of an external device.

Accordingly, conventional protruding current collector tabs are made redundant and may be dispensed with when designing batteries, in particular thin film batteries. The numerous disadvantages associated with these tabs may hereby be eliminated.

On the above background, the proposed solution is suitable for designing and manufacturing batteries comprising materials sensitive to water vapor. Accordingly, the absence of protruding connectors renders possible the complete sealing of the interior of the battery with respect to external contaminant agents, e.g. water vapor molecules.

In addition, by virtue of the disclosed solution, a multi-purpose packaging structure for batteries is obtained. Consequently, the structure acts simultaneously as a packaging, a water vapor barrier and a tab.

The above-discussed, substantial risk of tab breakage or tear while manufacturing or assembling the packaging structure and/or the battery is also eliminated.

Finally, the present invention enables the manufacture of batteries having a uniform profile, i.e. a profile not altered by expandable sealing layers.

Further advantages and features of embodiments will become apparent when reading the following detailed description in conjunction with the drawings.

BRIEF DESCRIPTION OF THE DRAWINGS

The invention will be better understood and objects other than those set forth above will become apparent when consideration is given to the following detailed description thereof. This description makes reference to the annexed drawings, wherein:

FIG. 4 shows a flow chart of the method for manufacturing of a multilayer packaging structure for a thin film battery in accordance with one embodiment of the present invention.

DETAILED DESCRIPTION OF THE INVENTION

Figure 1:
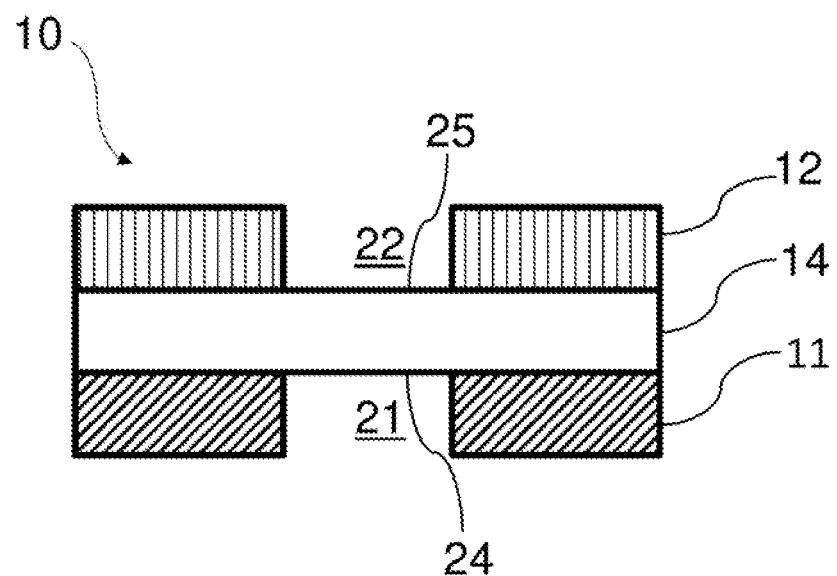
FIG. 1 is a cross-sectional view of a multilayer packaging structure for a thin film battery in accordance with one embodiment of the present invention.

Various embodiments are described hereinafter with reference to the Figures. It should be noted that elements of similar structures or functions are represented by like reference numerals throughout the Figures. It should also be noted that the Figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 is a cross-sectional view of a multilayer packaging structure 10 for a thin film battery in accordance with one embodiment of the present invention. The structure 10 comprises at least a first layer 11, a second layer 12 and a metal layer 14 sandwiched between the first layer 11 and the second layer 12, successively laminated on a surface of a substrate layer (not shown).

The first layer 11, facing the battery cell(s) of an assembled battery, is a heat sealable layer. This layer is preferably made of polypropylene. The polypropylene material used may be propylene, homopropylene, block propylene as well as other types of propylene. Low-crystallinity ethylene-butene copolymer, low crystallinity propylene-butene copolymer, terpolymers composed of three-component copolymers of ethylene, butene, and propylene, silica, Zeolite, acrylic resin beads and other anti-blocking agents, fatty acid amide-type slip agents and the like may be added to any of the above-mentioned types of polypropylene. The first layer 11 may also be composed of linear low-density polyethylene or mid-density polyethylene, or of a blended resin of linear low-density polyethylene and mid-density polyethylene.

A metal layer 14 has high vapor barrier properties in order to ensure dry atmosphere inside the battery. The suitable material is chosen from the group comprising aluminum, nickel and stainless steel. Alternatively, an inorganic compound, e.g. silicon oxide, alumina, or the like is vapor-deposited onto a metal foil layer. Metal foil that is part of the metal foil layer is preferably an aluminum foil having a thickness ranging between 20 and 100 microns. The thickness of the deposit is typically at least 15 microns. Hereby, pin-holing is prevented and process properties such as pouch formation and cold press moldability are improved.

The second layer 12, facing away from the battery cell(s) of an assembled battery, typically comprises a varnish. The varnish layer is obtained by adding an appropriate amount of silica-based, kaolin-based, or another inorganic material-based matting agent to an alkyl-based synthetic resin or a cellulose-based, polyamide-based, vinyl acetate-based, modified polyolefin-based, rubber-based, acrylic-based, urethane-based, or other olefin-based resin. Alternatively, the varnish layer may be obtained by adding an appropriate amount of a wax and a silica-based, kaolin-based, or other inorganic material-based matting agent to an alkyd-based synthetic resin or to the aforementioned olefin-based resin. The method for achieving the matte varnish layer is not limited in any particular way. Hence, different printing techniques, e.g. offset, gravure, flexoprint or silkscreen may be employed. Further, roll coating, reverse coating or thereto similar processes may be used.

A first opening 21 is arranged in the first layer 11 such that a first portion 24 of the metal layer 14 associated with the arranged first opening 21 is exposed. Here, the first portion 24 of the metal layer 14 associated with the arranged first opening 21 is configured to be able to be in electrical contact with a current collector of the thin film battery (not shown in FIG. 1). A second opening 22 is arranged in the second layer 12 such that a second portion 25 of the metal layer 14 associated with the arranged second opening 22 is exposed. Accordingly, the second portion 25 of the metal layer 14 associated with the arranged second opening 22 is configured to be able to be electrically connected to an external circuitry and advantageously faces external environment, once the battery is assembled. As easily seen in the embodiment of FIG. 1, the second opening 22 is arranged opposite with respect to the first opening 21. This arrangement with opposite opening 21, 22 is preferred but of course not limited to. The openings 21 and 22 may be offset in relation to each other.

As discussed above, by exposing a portion 24 of the metal layer 14 and bringing said portion 24 in electrical contact with a current collector of the thin film battery entails that the current collected by the current collector from the battery cell may be channelled out of the battery via the metal layer 14, more precisely via the other exposed portion 25 of the metal layer, i.e. the portion 25 that faces external environment, which is configured to be able to be electrically connected to an external circuitry of an external device. The collected current may subsequently be delivered to a suitably adapted external device. Thus, the exposed portions 24, 25 of the metal layer 14 effectively function as a current collector tab. In consequence, conventional protruding current collector tabs are made redundant and may be dispensed with when designing batteries, in particular thin film batteries. The numerous disadvantages associated with these tabs may hereby be eliminated. The risk of tab breakage or tear while manufacturing or assembling the packaging structure and/or the battery is also eliminated.

In a related context, the absence of protruding connectors renders possible the complete sealing of the interior of the battery with respect to water vapor molecules.

Conclusively, a multipurpose packaging structure 10 for batteries is obtained where the structure simultaneously acts as a packaging, a water vapor barrier and a tab.

The inventive packaging structure 10 here disclosed can be used when manufacturing primary and secondary batteries, typically lithium-ion batteries, where a presence of a metal layer in the packaging is required. Many different chemistry systems, e.g. systems based on cathodes such as Li, MnO, ($0<x<2$, $0<y<2$ and X-y=3), LiCoO, LiMPO (M=Fe, Mn, Co, Ni), LiAl Co, NiO ($0<x<1$, $0<y<1$, $0<z<1$ and x+y+z=1), LiNiloCo, O ($0<y<1$), LixVyOz could be used.

Figure 2A:
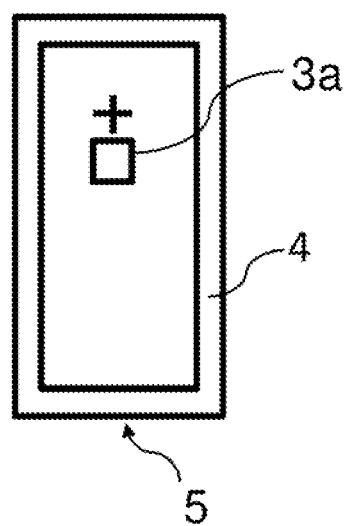
FIGS. 2a and 2b present perspective, schematic views of an assembled thin film battery in accordance with the embodiment of the present invention described in connection with FIG. 1.
Figure 2B:
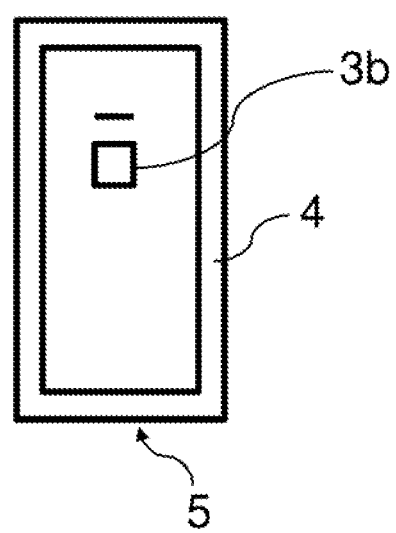

FIGS. 2a and 2b present perspective, schematic views of an assembled thin film battery 5 in accordance with the embodiment of the present invention described in connection with FIG. 1.

A front and a back sides of the assembled thin film battery 5 are shown in FIGS. 2a and 2b, respectively. In one, non-limiting embodiment, the battery cell enclosed by the packaging structure could be of the pouch type. The assembled battery comprises a multilayer packaging structure of the present invention. As seen in FIGS. 2a and 2b, the battery 5 comprises a first (positive) terminal 3a arranged in the packaging structure 10 on one side of the battery 5 and a second (negative) terminal 3b arranged in the packaging structure 10 on opposite side of the battery 5. The edges 4 of the battery 5 are hermetically sealed and the terminals 3a, 3b are embedded in the packaging structure. Here, battery terminals 3a, 3b are the electrical contact points used to connect an external circuitry (not shown) to the battery 5. For the purposes of this application, the term "battery terminal" comprises the portion of the metal layer that faces the external environment. External elements (not shown) such as wires or planes can be added to the battery, on the top of the metal layer, by welding, bonding or printing process. The size, shape and position of the battery 5 and its terminals 3a, 3b can be modified according to the requirements of the powered product.

Figure 3:
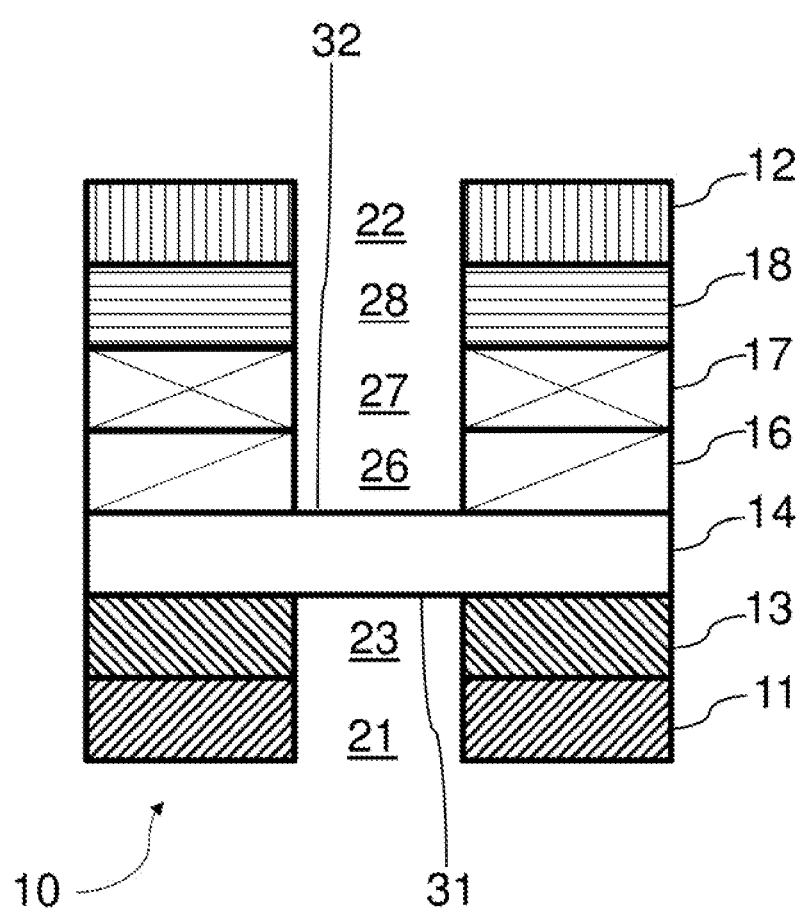
FIG. 3 is a cross-sectional view of a multilayer packaging structure for a thin film battery in accordance with another embodiment of the present invention.

FIG. 3 is a cross-sectional view of a multilayer packaging structure 10 for a thin film battery 5 in accordance with another embodiment of the present invention. With reference to FIG. 3 and for the sake of brevity, the layers thoroughly described in conjunction with FIG. 1 are not further discussed. Analogously to the layers of the packaging structure 10 shown in FIG. 1, all layers of the packaging structure of FIG. 3 are successively laminated on one surface of the substrate layer (not shown).

Accordingly, it is shown at least a third layer 13 sandwiched between the first layer 11 and the metal layer 14, wherein a third opening 23 is arranged in the third layer 13, the center of said third opening 23 being aligned with the center of the first opening 21 arranged in the first layer 11, such that a portion 31 of the metal layer 14 associated with the arranged first and third openings 21, 23 is exposed and configured to be able to be in electrical contact with a current collector of the thin film battery 5. By way of example, the third layer 13 is an acid-modified polypropylene layer, preventing electrolyte penetration into the metal layer 14. The third layer 13 is bonded to the metal layer 14 by means of an adhesive that ensures high adhesion.

It is further shown a plurality of additional layers 16, 17, 18 sandwiched between the second layer 12 and the metal layer 14. An additional opening 26, 27, 28 is arranged in the each additional layer 26, 27, 28, the center of said additional opening 26, 27, 28 being aligned with the center of the second opening 22 arranged in the second layer 12, such that a portion 32 of the metal layer 14 associated with the arranged second and additional openings 22, 26, 27, 28 is exposed. The additional layer 18 of the shown multilayer structure 10 comprises a polyester resin layer with the role to protect the metal layer from scratching and abrasion. The usable polyester resins include e.g. polyethylene terephthalate, polybutylene terephthalate, polyethylene naphthalate, polybutylene naphthalate, co-polyester, polycarbonate, and the like. An adhesive or a polyolefin resin can be used as the bonded layer. Specific examples of adhesives may include polyvinyl acetate-based adhesives, ethyl and butyl acrylates, 2-ethylhexyl esters, and other homopolymers, or polyacrylic acid ester-based adhesives composed of copolymers or the like of the above compounds with methyl methacrylate, acrylonitrile, styrene, or the like, cyanoacrylate based adhesives, ethylene copolymer-based adhesives composed of ethylene and vinyl acetate, ethyl acrylate, acrylic acid, methacrylic acid, and other monomers, cellulose-based adhesives, polyester-based adhesives, polyamide based adhesives, polyimide-based adhesives; amino resin based adhesives composed of urea resin, melamine resin, or the like, phenol resin-based adhesives, epoxy-based adhesives, polyurethane-based adhesives, reactive (meth)acrylic based adhesives, rubber-based adhesives composed of chloroprene rubber, nitrile rubber, styrene-butadiene rubber, and the like, silicone-based adhesives, inorganic-based adhesives composed of alkali metal silicates, low-melting glass, and the like and other adhesives. Next additional layer 17 may be an oriented nylon film, for instance a polyamide resin, specifically, nylon 6, nylon 6,6, a copolymer of nylon 6 and nylon 6,6, nylon 6,10, poly meta-xylylene adipamide (MXD6), or the like. This layer is bonded to the metal layer by means of an adhesive layer 16. The bond may be achieved by using dry lamination technique.

As seen in FIG. 3, all openings have the same radius, but other alternatives are conceivable. Moreover the aligned openings on one face of the metal layer 14 are preferably arranged opposite with respect to the aligned openings on the other face of the metal layer 14. But the aligned openings on each face of the metal layer 14 may be offset in relation to each other.

On a general level, the more layered the packaging structure is, the better its performance becomes. Accordingly, by employing more layers, the properties such as formability, resistance to electrolytes and heat radiation could be significantly improved.

FIG. 4 shows a flow chart of the method 30 for manufacturing of a multilayer packaging structure for a thin film battery in accordance with one embodiment of the present invention.

Initially, a first layer 11 is provided 40. Thereafter, a metal layer 14 is provided 50 on top of the first layer 11. Subsequently, a second layer 12 is provided 60 on top of the metal layer 14 such that the metal layer 14 is sandwiched between the first layer 11 and the second layer 12. In next step, a first opening 21 is arranged 70 in the first layer 11 such that a first portion 24 of the metal layer 14 associated with the arranged first opening 21 is exposed. Then, the first portion 21 of the metal layer 14 associated with the arranged first opening 21 is configured 80 so that it is able to be in electrical contact with a current collector of the thin film battery 5. A second opening 22 is subsequently arranged 90 in the second layer 12 such that a second portion 25 of the metal layer 14 associated with the arranged second opening 22 is exposed, said second portion 25 of the metal layer 14 being configured to be able to be electrically connected to an external circuitry. Advantageously, the second portion 25 of the metal layer 14 associated with the arranged second opening 22 faces external environment.

For a detailed discussion of effects, advantages and benefits attributable to the method, a reference is made to the suitable section of the description related to FIG. 1.

In another embodiment, at least a third layer 13 sandwiched between the first layer 11 and the metal layer 14 is provided, and a third opening 23 is arranged in the third layer 13, the center of said third opening 23 being aligned with the center of the first opening 21 arranged in the first layer 11, such that a portion 31 of the metal layer 14 associated with the arranged first and third openings 21, 23 is exposed and configured to be able to be in electrical contact with a current collector of the thin film battery 5. In yet another embodiment, at least one additional layer 16, 17, 18 sandwiched between the second layer 12 and the metal layer 14 is provided, and an additional opening 26, 27, 28 is arranged in the each additional layer 16, 17, 18, the center of said additional opening 26, 27, 28, being aligned with the center of the second opening 22 arranged in the second layer 12, such that a portion 32 of the metal layer 14 associated with the arranged second and additional openings 22, 26, 27, 28, is exposed and configured to be able to be electrically connected to an external circuitry. The layer configurations in accordance with these two embodiments, with several aligned openings on each face of the metal layer 14, maintain the access to the metal layer 14. The aligned openings on one face of the metal layer 14 are preferably arranged opposite with respect to the aligned openings on the other face of the metal layer 14. But the aligned openings on each face of the metal layer 14 may be offset in relation to each other.

In a related embodiment, at least one of the openings is achieved either by cutting or punching the material of the layer(s) or by selectively depositing melted components on the metal layer 14.

Alternatively, at least one of the openings is achieved by selectively removing a suitable portion of the layer material, wherein the selective removal of the suitable portion of the layer material is achieved using laser ablation.

In the drawings and the description, there have been disclosed typical preferred embodiments of the invention and, although specific terms are employed, they are used in a generic and descriptive sense only and not for purposes of limitation, the scope of the invention being set forth in the following claims.

The invention claimed is:

1. A multilayer packaging structure for a thin film battery, said structure comprising at least:
a first layer,
a second layer formed of a varnish,
a metal layer sandwiched between the first layer and the second layer,
wherein said structure further comprises:
a first opening arranged in the first layer such that a first portion of the metal layer associated with the arranged first opening is exposed, said first portion of the metal layer being configured to be able to be in electrical contact with a current collector of the thin film battery,
a second opening arranged in the second layer such that a second portion of the metal layer associated with the arranged second opening is exposed, said second portion of the metal layer being configured to be able to be electrically connected to an external circuitry.

2. The multilayer packaging structure according to claim 1, wherein the second opening is arranged opposite with respect to the first opening.

3. The multilayer packaging structure according to claim 1, wherein the structure further comprises:
at least a third layer sandwiched between the first layer and the metal layer, and
a third opening arranged in the third layer, the center of said third opening being aligned with the center of the first opening arranged in the first layer, such that a portion of the metal layer associated with the arranged first opening and third opening is exposed and configured to be able to be in electrical contact with a current collector of the thin film battery.

4. The multilayer packaging structure according to claim 1, wherein the structure further comprises:
at least one additional layer sandwiched between the second layer and the metal layer, and
an additional opening arranged in the each additional layer, the center of said additional opening being aligned with the center of the second opening arranged in the second layer, such that a portion of the metal layer associated with the arranged second opening and additional openings is exposed and configured to be able to be electrically connected to an external circuitry.

5. A method for manufacturing a multilayer packaging structure for a thin film battery, wherein said method comprising following steps:
providing a first layer,
providing a metal layer on top of the first layer,
providing a second layer made of a varnish on top of the metal layer such that the metal layer is sandwiched between the first layer and the second layer,
arranging a first opening in the first layer such that a first portion of the metal layer associated with the arranged first opening is exposed,
configuring the first portion of the metal layer associated with the arranged first opening so that it is able to be in electrical contact with a current collector of the thin film battery,
arranging a second opening in the second layer such that a second portion of the metal layer associated with the arranged second opening is exposed, said second portion of the metal layer being configured to be able to be electrically connected to an external circuitry.

6. The method according to claim 5, wherein said method further comprising following steps:
providing at least a third layer sandwiched between the first layer and the metal layer, and arranging a third opening in the third layer, the center of said third opening being aligned with the center of the first opening arranged in the first layer, such that a portion of the metal layer associated with the arranged first opening and third opening is exposed and configured to be able to be in electrical contact with a current collector of the thin film battery.

7. The method according to claim 5, wherein said method further comprising following steps:
providing at least one additional layer sandwiched between the second layer and the metal layer, and
arranging an additional opening in the each additional layer, the center of said additional opening being aligned with the center of the second opening arranged in the second layer, such that a portion of the metal layer associated with the arranged second opening and additional openings is exposed and configured to be able to be electrically connected to an external circuitry.

8. The method according to claim 5, wherein at least one of the openings is achieved by cutting or punching.

9. The method according to claim 5, wherein at least one of the openings is achieved by selectively depositing melted components on the metal layer.

10. The method according to claim 5, wherein at least one of the openings is achieved by selectively removing a suitable portion of the layer material.

11. The method according to claim 10, wherein the selective removal of the suitable portion of the layer material is achieved using laser ablation.

12. A thin film battery comprising a multilayer packaging structure according to claim 1.

13. The thin film battery according to claim 12, wherein the battery cell is of the pouch type.

14. The thin film battery according to claim 12, wherein it comprises a first terminal arranged in the packaging structure on one side of the battery and a second terminal arranged in the packaging structure on opposite side of the battery.

* * * * *